July 20, 1954  H. A. GOTTSCHALL  2,684,397
BATTERY AND METHOD OF MAKING SAME
Filed Nov. 15, 1951  2 Sheets-Sheet 2
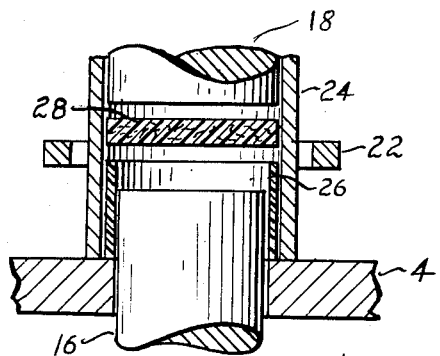
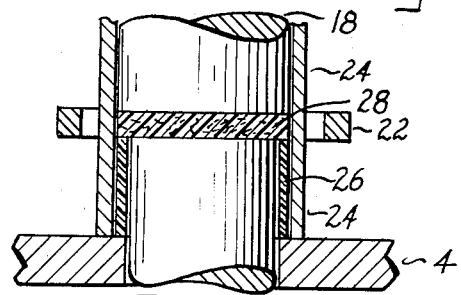
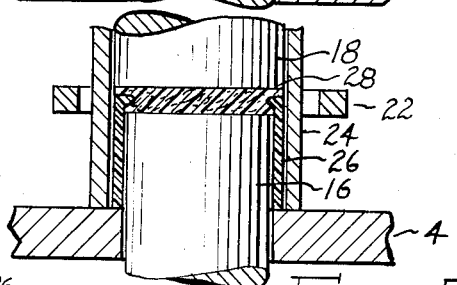
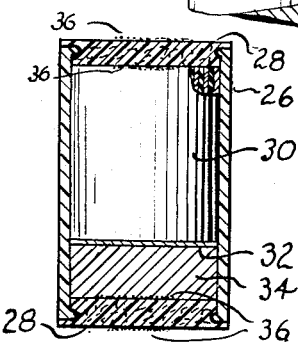
INVENTOR.
HERBERT A. GOTTSCHALL
BY
Leonard H. King
AGENT

Patented July 20, 1954

2,684,397

UNITED STATES PATENT OFFICE 2,684,397

BATTERY AND METHOD OF MAKING SAME

Herbert A. Gottschall, Clifton, N. J., assignor to Myron A. Coler, New York, N. Y.

Application November 15, 1951, Serial No. 256,470

6 Claims. (Cl. 136—133)

This invention relates to an improved plastic container having electrically conductive portions and in particular to devices utilizing such containers and method of making same.

In a copending application of Myron A. Coler, entitled "Container and Related Devices," Serial Number 256,518, filed approximately November 15, 1951, there are disclosed containers having electrically conductive and insulating plastic regions. In part, this invention provides an improvement over the containers disclosed in the above referenced application. Further, this application discloses a method for obtaining leakproof seals between conductive and non-conductive plastics while sealing into a container a complete electrochemical system, a problem made difficult by the presence of liquid electrolyte.

It is a general object of this invention to provide an improved tightly sealed plastic container.

It is another object of this invention to provide a method of making tightly sealed plastic containers.

A further object of this invention is to provide a method of making tightly sealed containers having conductive plastic inserts.

Another object of this invention is to provide an improved battery.

A particular object of this invention is to provide a method of making improved tightly sealed plastic encased primary dry cells, which is suitable for mass production.

Another particular object of this invention is to provide a leakproof cell made of components of simple shape.

Other objects and advantages of the invention will become apparent as the description proceeds.

Referring to the drawings:

Figure 2 is a cross-sectional view, in elevation, of the components utilized to make a simple container prior to assembly.

Figure 3 shows in elevation the cross-section of an assembled all-plastic cup in the assembly jig.

Figure 4 is a cross-sectional elevation of a preferred device of this invention.

Figure 5 illustrates in cross-section a battery of this invention.

Figure 1:
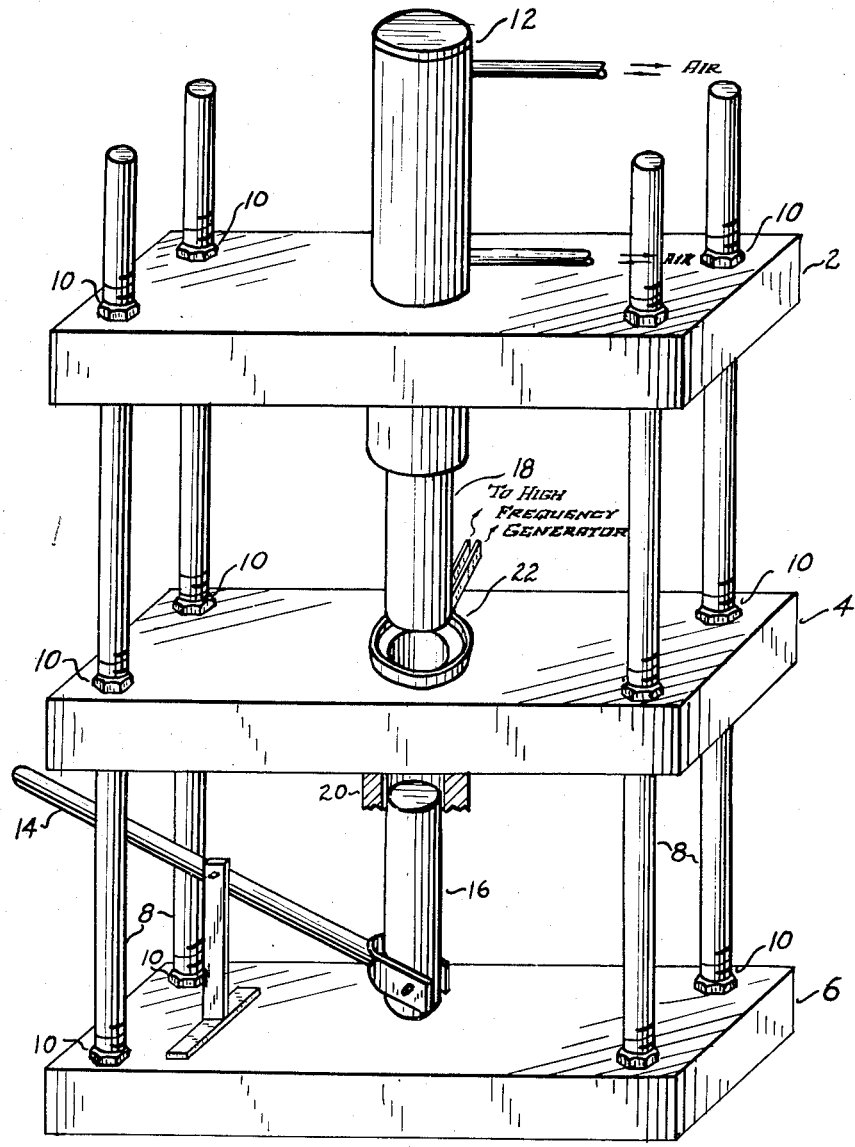
Figure 1 is a perspective view of a simple apparatus for carrying out the process of this invention.

Referring to the drawings in detail, like parts being designated by like reference characters, and first considering the embodiment of my invention illustrated in Figures 1, 2, 3 and 4 wherein a sealed container such as that shown in Figures 3 and 4 are made by means of the apparatus of Figure 1. Three two inch thick supports 2, 4, 6 formed of asbestos boards, are mounted in a horizontal position on four one-inch threaded brass supports 8, locking nuts 10 position said supports 2, 4, 6. An air cylinder 12 is mounted on upper support 2. Support 4 is used to support the work. Lower support 6 has mounted thereon a lever system 14 which positions lower piston 16 which is formed from a glass rod. A guide 20 is provided for the piston. A similar glass piston 18 is mounted so it is operated by the air cylinder. An induction coil 22 is connected to a high frequency generator, not shown.

In carrying out one embodiment of this invention a phenolic retaining cylinder 24, an insulator plastic tube 26 and a conductive plastic cap 28 are assembled onto support 4 in the relative position illustrated in Figure 2 where the components are shown separated for clarity of illustration. The assembly is positioned inside of induction coil 22 so that the conductive plastic cap 28 is in the same plane as said coil. If, now, the upper piston 18 is lowered to apply moderate pressure while the lower piston is raised to barely touch the lower side of cap 28 and sufficient energy supplied from a high frequency generator to the coil 22 the plastic can be sufficiently softened to form the simple butt seal shown in Figure 3. However, it is preferred that the lower piston be kept at a level about $\frac{1}{16}$ to $\frac{1}{8}$ inch (for materials of that general thickness range) below the cap. Upon the application of heat by means of high frequency energy transmitted by the induction coil 22, the cap is softened and since the top region of the insulator cylinder 26 is not supported and is softened by heat transmitted from the cup, pressure from piston 18 would cause it to deform inwardly while the conductive plastic cap 28 would be forced to flow around the deformation to form the interlocking seal shown in Figure 4.

The upper glass piston 18 may be rested lightly on the conductive plastic cap 28 during the heating period. Pressure can be applied but is not necessary.

The heating period can vary from 2 to 60 seconds or more depending upon the conductivity of the conductive plastic cap 28. The amount of energy required will of course vary with the size of the piece to be heated and its heat distortion temperature. Pressure requirements will vary broadly from possibly 5 pounds to 1000 pounds depending on the strength of the supporting cylinder. The preferable pressure range is between 60 and 120 pounds total pressure.

The seal should be cooled under pressure, the duration of the cooling period under pressure being determined by the time required for the plastics to cool below their distortion temperature. It is important, however, that the lower glass piston 16 be removed from the insulator cylinder 26 before the newly formed cup shrinks around the piston 16 sufficiently to make removal difficult. A period between 20 and 40 seconds is usually preferable.

After cooling, the completed cup is ejected from the retaining cylinder 24.

In an actual application a polystyrene tube ½ inch long and ⅝ inch diameter having a 1/16 inch wall was sealed to a 1/16 inch thick conductive plastic disc. The conductive plastic was a polystyrene base product containing 10% silver and having a specific resistivity of 0.01 ohm-centimeter. The general procedure described above was followed with a heating period of 10 seconds. The high frequency generator was operated at 130 volts positive plate voltage at 285 milliamperes plate current and an output frequency of 450 kilocycles. A pressure of 100 pounds produced a seal as shown in Figure 4 which was leakproof.

The completed cup was charged with components of an alkaline dry cell having an anode 30 consisting of a roll of amalgamated zinc foil interwound with a strip of porous electrolyte retaining material and a porous separating disc 32 to separate the anode from the cathode material 34. Electrolyte was introduced and a covering cap of conductive plastic was sealed on. The height of the components was so chosen as to place them in tight compression against the caps after the sealing operation.

The closure bonding procedure employed was similar to cup formation as described above except that the lower glass piston was lowered to a position even with the work support to provide a level support for the cell.

In closure bonding the heating time can be reduced approximately ¼–⅓ since the electrochemical system also is somewhat heated inductively and therefore does not remove heat from the cap by conductivity as does the glass plunger used in cup formation. Heating cycles between 6 and 8 seconds are preferable. Longer periods tend to heat the electrochemical system excessively.

If pressure is applied during the heating cycle the electrochemical system is compressed prematurely and electrolyte tends to be forced from the casing. It wets the closure regions and tends to prevent bonding. It is therefore preferable to apply pressure at the conclusion of the heating cycle.

It is desirable to allow longer cooling periods in closure bonding than cup formation since the entire cell is heated and there is more heat to be evolved. Forty-five to sixty seconds are preferred. Longer times can be used since the shrinkage problem mentioned in cup formation is not present.

The completed cell is then ejected from the retaining cylinder 24.

It is desirable to coat a metal bullseye 36 on the ⅝ inch diameter conductive plastic cap (both sides) to make heat distribution throughout the cap more uniform. Ordinarily, induced heat will be greater around the periphery of the cap. This would tend to cause weak areas in the center of the cap if the heat were not distributed. In addition, this metal cladding serves to reduce contact resistance to and from the conductive plastic caps. The coating is readily applied by heat sealing metal powder to the surface by means of a hot die under pressure. This is claimed in the referenced application of Myron A. Coler.

The foregoing described the manufacture of a battery in terms of a manual operation. It is apparent that the process may be readily carried out by automatic or semi-automatic machinery utilizing the disclosed principles.

While I prefer to use conductive plastics containing silver for alkaline cells, other conductive plastic materials which would be non-reactive under the conditions may be used.

The insulator cylinder may be formed from a number of thermoplastic high polymers which are inert to the chemical and electrochemical reactions of the cell. These include modified polystyrene, vinyl chloride, polymonochlorotrifluoroethylene.

Other uses for the container of this invention will be obvious.

The advantages of this invention in utilizing simple geometric configurations to obtain a complex locking joint will be obvious to those skilled in the art.

Although preferred embodiments have been disclosed, it will be understood that modifications may be made within the spirit and scope of the invention.

I claim:

1. In a dry cell, a tight assembly comprising a tubular section of insulator plastic having at each end a cap of conductive plastic interlocked with said insulator plastic, said interlocking being characterized by an annular groove in each of said conductive plastic caps being filled with a portion of said insulator plastic and being sealed thereto, said interlocking resulting from distortion of said tubular insulator plastic and said end caps under heat and pressure.

2. A battery cell of the alkaline type having a zinc-mercuric oxide electrochemical system sealed into a container consisting of a tubular member of insulator plastic, an anode end cap of conductive plastic, a cathode end cap of conductive plastic, said end caps being sealed to said tubular member in an interlocking arrangement formed by deformation of said tubular member and said caps, the conductive plastic not being chemically or electrochemically reactive with said electrochemical system.

3. The battery cell of claim 2 having an adherent coating of a metal powder on the surface of said cap, said powder being characterized by lack of chemical or electrochemical reaction with components of said cell.

4. The method of making batteries comprising inserting a tubular insulating plastic member into a retaining member, placing a conductive plastic cap into contact with an end of said tubular member, heating said conductive plastic cap and said tubular member, applying pressure to said conductive plastic cap to cause said tubular insulating member to deform and cause said conductive plastic cap to flow about said deformed portion and be sealed to said tubular member, inserting an electrochemical system and sealing on a closure cup of conductive plastic while maintaining said electrochemical system under pressure.

5. A plastic container comprising an insulating plastic tubular member having inwardly projecting flanges at each end, said flanges filling a recess in a conductive plastic cap member, said conductive plastic being sealed to said insulating plastic.

6. The method of making a tight seal between a thermoplastic tubular member and a thermoplastic cap portion covering the opening in said plastic tubular member comprising heating the plastic in the region to be sealed, applying sufficient pressure to deform the upper portion of the said tubular member by forming an inwardly projecting flange and forcing the said plastic cap to flow about said projecting flange and be sealed thereto.

References Cited in the file of this patent

UNITED STATES PATENTS

| Number | Name | Date |
|---|---|---|
| 2,189,955 | Hokerk | Feb. 13, 1940 |
| 2,354,714 | Strickland | Aug. 1, 1944 |
| 2,525,355 | Hoyler | Oct. 10, 1950 |
| 2,544,115 | Wagner | Mar. 6, 1951 |
| 2,546,379 | Woodring et al. | Mar. 27, 1951 |
| 2,551,354 | Wasilevich | May 1, 1951 |
| 2,572,017 | Ellis | Oct. 23, 1951 |